Dec. 26, 1961   R. McKAY McNUTT   3,014,588
CLASSIFIERS FOR THE SEPARATION OF COMMINUTED MATERIALS
INTO LIGHT AND HEAVY COMPONENT FRACTIONS
Filed June 13, 1960

United States Patent Office 3,014,588
Patented Dec. 26, 1961

3,014,588
CLASSIFIERS FOR THE SEPARATION OF COMMINUTED MATERIALS INTO LIGHT AND HEAVY COMPONENT FRACTIONS
Russell McKay McNutt, 100 Annan House, Commissioner St., Johannesburg, Transvaal, Union of South Africa
Filed June 13, 1960, Ser. No. 35,788
Claims priority, application Union of South Africa Apr. 11, 1956
6 Claims. (Cl. 209—434)

This application is a continuation-in-part of my patent application Serial No. 649,783 filed April 1, 1957, now abandoned.

The invention forming the subject of the present application relates to classifiers for the separation of comminuted materials into light and heavy component fractions.

A classifier according to the invention comprises a vertically extending spiral ramp down which materials to be separated pass, the ramp being formed from flexible material and having a radially inner side and a radially outer side, support means for the ramp, vertical reciprocation means for subjecting the inner side of the ramp to vertical reciprocating movements, horizontal oscillation means adapted to be connected to the support means of the ramp for subjecting the ramp to horizontal oscillating movements, the vertical reciprocation means and the oscillation means operating simultaneously during passage of the materials down the ramp, and means to anchor the outer radial side of the ramp against reciprocatory movement.

Also according to the invention the classifier includes side walls on at least the radially inner side to retain unseparated material, the inner side wall being interrupted for the discharge of separated materials.

Further according to the invention the support means comprises a horizontal annular frame having upright outer ramp supporting columns mounted in spaced relationship on the upper side of the frame and located around the radially outer side of the ramp, downwardly projecting runway segments mounted in spaced relationship on the underside of the frame, rollers horizontally mounted on supports to engage the projecting runway segments, upright centre ramp supporting columns mounted in spaced relationship on the vertical reciprocating means at the centre of the annular frame and located around the radially inner side of the ramp, and connecting means for connecting the upright columns of the annular frame to the upright columns of the vertical reciprocating means and for supporting the ramp therebetween.

In the preferred forms of the invention the arms are pivoted between the upright columns on the frame and the columns on the reciprocating means, the pivotal connection to the columns being of a partially universal character.

In order to illustrate the invention an embodiment is described hereunder with reference to the accompanying drawings in which.

Figure 1:
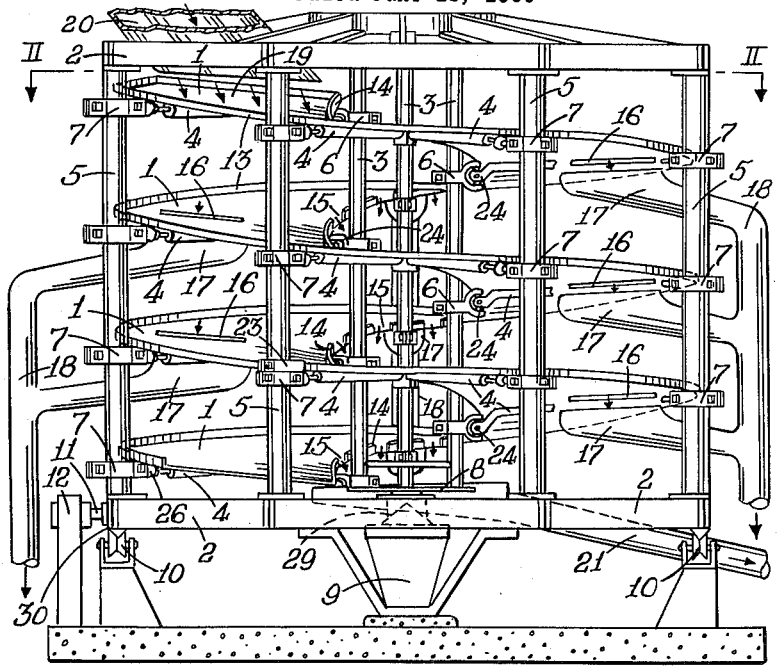
FIGURE 1 is a side elevation of a classifier according to the invention.

Referring to the drawings, the classifier comprises a vertically mounted spiral ramp 1 which is supported on a framework 2 and four central columns 3. The spiral ramp 1, of suitable flexible material, rests on spiders or bifurcated arms 4 extending from the central columns 3 to the upright members 5 of the framework 2, the arms being adjustably secured to the columns 3 and members 5 by means of clamps 6 and 7 respectively.

The central columns 3 are held in spaced relationship by members 8 and are connected at the bottom to a mechanical vibrator anchored to the floor beneath the classifier and shown diagrammatically at 9. The vibrator is adapted to impart to the ramp 1 reciprocating movement in an axial direction through the columns 3.

Framework 2 is supported for rotational movement on rollers 10 and is connected at 11 to a mechanical oscillator 12 which imparts to the framework and ramp 1 oscillating movement of small amplitude, say ⅜″. Rollers 10 are engaged by runway segments 30 on the underside of the frame.

The ramp 1 is provided with side walls 13, 14 for retaining material on the ramp. Side wall 14 along the inner periphery of the ramp 1 is interrupted at intervals along its length to provide openings 15 through which the heavier fractions of the material may be discharged.

Ramp 1 is furthermore provided at intervals with slots 16 which are located towards the outer periphery of the ramp, the lighter fractions discharging through the slot. Catchment troughs 17 are located beneath the slots 16 and are connected to conduits 18.

In operation, material to be separated into different fractions is fed on to the topmost end 19 of the ramp 1 for passage down the ramp. During its downward movement, the material will be influenced by the reciprocating movement imparted to the ramp by the vibrator 9 and by the oscillating movement resulting from the use of oscillator 12. These movements will cause the heavier fractions to move towards the inner periphery of the ramp 1 and the lighter fractions to move outwardly towards the outer periphery. The heavier fractions are discharged through the openings 15 in the side wall 14 and are collected at the bottom centre of the ramp 1 from whence they may be removed, for example, by a conduit 21. The lighter fractions are discharged through the slots 16 and removed via the catchment troughs 17 and conduits 18.

It will be appreciated that the pitch of the spiral and the transverse inclination of the ramp can be adjusted to obtain optimum results by varying the points of attachment of the clamps 6 and/or 7 on the columns 3 and members 5.

Various modifications may be made in the invention without departing from its scope. For example, means may be provided for varying the extent of the openings 15 and/or slots 16. Baffles 22 may also be provided on the ramp 1 for directing the separated lighter fractions towards the outer periphery of the ramp 1 and separated heavier fractions towards the inner periphery. The baffles may be adjusted to any desired position or angle.

Figure 2:
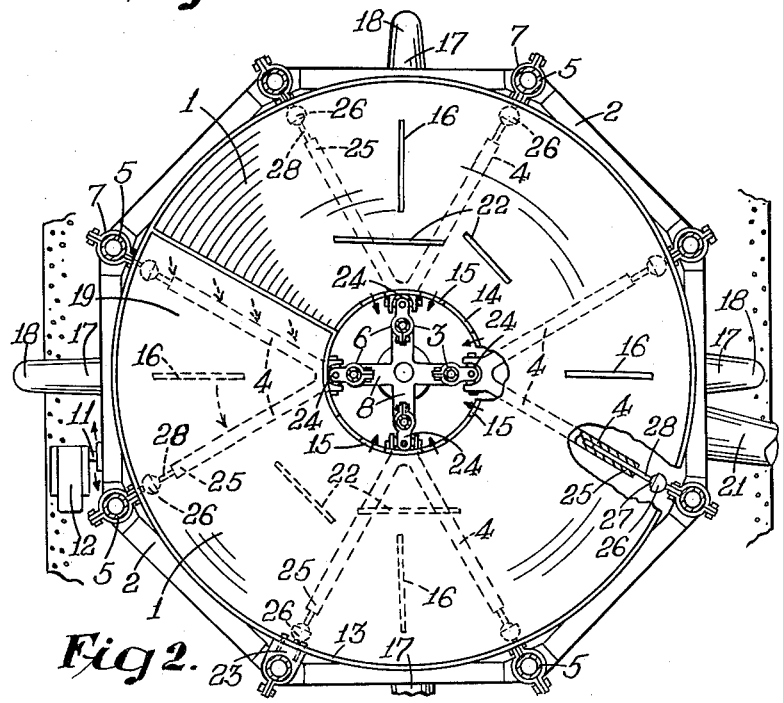
FIGURE 2 is a section on the line II—II of FIGURE 1.

The essential feature of the invention is the employment of a ramp in which the entire ramp is subjected to an horizontal oscillatory motion while the inner edge of the ramp is reciprocated up and down. To prevent the outer edge of the ramp being reciprocated in sympathy with the inner edge it is anchored to the columns 5 by means of anchor brackets 23 which are bolted through the outer wall 13 of the ramp. The brackets 23 embrace the columns 5 as shown in FIGURE 2.

In view of the relative movement of the columns 5 in relation to the columns 3 the connection of the arms 4 to the columns is of a universal character. Thus clamps 6 and the innermost ends of the arms 4 engage by means of universal knuckle joints 24 which permit the arms 4 to move about their pivots in a vertical direction. The arm used in the embodiment is of a triangulated nature with the apex coupled to the column 3. The free ends 25 have a ball and socket connection 26 to the columns 5. As illustrated in FIGURE 2 the ball portion 27 includes a stem 28 adapted to slide in a bore in the arm; this feature catering for the change in the effective length of the arms as the arms reciprocate about the pivots established on the columns 5.

The example under consideration is one in which the columns 3 are slidably mounted on the vibrator 9 so that they may oscillate horizontally with the ramp. It will be seen that the vibrator includes a conical bearing surface 29 on which a mating bearing arrangement rides. In other embodiments of the invention the columns 3 could be held against horizontal oscillation and in these cases various modifications may be necessary in the method of connecting the arms 4 in position.

I claim:

1. A classifier for separating solid comminuted materials into heavy and light component fractions comprising a vertically extending spiral ramp down which materials to be separated pass, the ramp being formed from flexible material and having a radially inner side and a radially outer side, support means for the ramp, vertical reciprocation means for subjecting the inner side of the ramp to vertical reciprocating movements, horizontal oscillation means adapted to be connected to the support means of the ramp for subjecting the ramp to horizontal oscillating movements, the vertical reciprocation means and the oscillation means operating simultaneously during passage of the materials down the ramp, connecting means for at least indirectly coupling the vertical reciprocation means to the ramp through at least partially universal coupling means, and means to anchor the outer radial side of the ramp against reciprocatory movement.

2. The classifier claimed in claim 1 including side walls on at least the radially inner side of the ramp, the inner side wall being interrupted for the discharge of separated materials.

3. The classifier claimed in claim 2 in which the support means comprises a horizontal annular frame having upright outer ramp supporting columns mounted in spaced relationship on the upper side of the frame and located around the radially outer side of the ramp, downwardly projecting runway segments mounted in spaced relationship on the under side of the frame, rollers horizontally mounted on supports to engage the projecting runway segments, upright center ramp supporting columns mounted in spaced relationship on the vertical reciprocating means at the center of the annular frame and located around the radially inner side of the ramp, and said connecting means being effective for connecting the upright columns of the annular frame to the upright columns of the vertical reciprocating means and for supporting the ramp therebetween, said connecting means being pivotally connected to the outer upright columns on the frame and being coupled to the upright columns of the reciprocating means through said at least partially universal coupling means.

4. A clasisfier for separating solid comminuted materials into heavy and light component fractions comprising a vertically extending spiral ramp down which materials to be separated pass, the ramp being formed from flexible material and having a radially inner side and a radially outer side, support means for the ramp, vertical reciprocation means for subjecting the inner side of the ramp to vertical reciprocating movements, horizontal oscillation means adapted to be connected to the support means of the ramp for subjecting the ramp to horizontal oscillating movements, the vertical reciprocation means and the oscillation means operating simultaneously during passage of the materials down the ramp, and means to anchor the outer radial side of the ramp against reciprocatory movement, said walls on at least the radially inner side of the ramp, the inner side wall being interrupted for the discharge of separated materials, said support means comprises a horizontal annular frame having upright outer ramp supporting columns mounted in spaced relationship on the upper side of the frame and located around the radially outer side of the ramp, downwardly projecting runway segments mounted in spaced relationship on the under side of the frame, rollers horizontally mounted on supports to engage the projecting runway segments, upright center ramp supporting columns mounted in spaced relationship on the vertical reciprocating means at the center of the annular frame and located around the radially inner side of the ramp, and connecting means for connecting the upright columns of the annular frame to the upright columns of the vertical reciprocating means and for supporting the ramp therebetween, said connecting means comprising arms pivoted between the upright columns on the frame and the columns on the reciprocating means, the pivotal connection to the columns being of a partially universal character.

5. A classifier as defined in claim 1, wherein said connecting means comprises a plurality of arms.

6. A classifier as defined in claim 3, wherein said connecting means comprises a plurality of arms.

References Cited in the file of this patent

UNITED STATES PATENTS

| 750,281 | Hicks | Jan. 26, 1904 |
| 829,493 | Thurston | Aug. 28, 1906 |
| 1,880,185 | Kerns | Sept. 27, 1932 |
| 2,584,976 | Bailey | Feb. 12, 1952 |
| 2,700,469 | Humphreys | Jan. 25, 1955 |